Patented Jan. 1, 1935

1,985,949

UNITED STATES PATENT OFFICE 1,985,949

MERCURY DERIVATIVES OF NITRO-PARA-CRESOLS

George W. Raiziss, Philadelphia, Pa., assignor to Abbott Laboratories, North Chicago, Ill., a corporation of Illinois No Drawing. Application December 7, 1931, Serial No. 579,652

8 Claims. (Cl. 260—13)

My invention relates to certain new compounds which have been found to be especially effective as bactericidal and bacteriostatic agents, particularly in combating infectious diseases, and relates more particularly to mercury derivatives of nitrocresole.

In my Patent No. 1,554,293, granted September 22, 1925, and reissued as No. 17,563, dated January 14, 1930, and in my Patent No. 1,630,072, granted May 24, 1927, there are described certain mercury derivatives of nitro-ortho-cresol. These derivatives were found to have excellent properties as bactericides. However, my continued research has developed the fact that mercury derivatives of nitro-para-cresol and their various isomers may likewise be prepared and that certain of these last-mentioned derivatives possess markedly superior qualities to those of the previously known derivatives.

These new nitro-cresol derivatives differ from each other, sometimes to a considerable extent, in their physical, chemical and bacteriological properties, and may be represented by the typical formula:

R—HgX for the mono-mercury derivatives, and

R—(HgX)$_2$ for the di-mercury derivatives, wherein R represents any of the isomers of nitro-para-cresol and X represents an acetoxy group, CH$_3$COO—, a halogen, a hydroxy group —OH, or, when a molecule of water is removed from the latter, an anhydro-hydroxy group —O—.

In preparing these new products, I mercurate any of the isomers of a nitro-para-cresol and produce first an acetoxy-mercuri compound. This is then converted into an anhydro-hydroxy-mercuri derivative according to the following reactions:

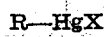
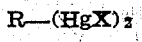

C$_6$H$_2$—CH$_3$—NO$_2$—OH+Hg (OOC—CH$_3$)$_2$→
C$_6$H$_2$—CH$_3$—NO$_2$—OH—HgCOO—CH$_3$+CH$_3$COOH

C$_6$H$_2$—CH$_3$—NO$_2$—OH—Hg—COO—CH$_3$+NaOH→
C$_6$H$_2$—CH$_3$—NO$_2$—O—Hg+CH$_3$—COONa+H$_2$O

The hydroxy-mercuri derivatives are preferably formed as alkali metal salts, in alkaline solution, as follows:

C$_6$H$_2$—CH$_3$—NO$_2$—OH—HgCOOCH$_3$+2NaOH→
C$_6$H$_2$CH$_3$—NO$_2$—ONa—HgOH+CH$_3$—COONa+H$_2$O.

The halogen derivatives may be formed by treating either the acetoxy, hydroxy or anhydro-hydroxy derivatives with a halide acid, thus:

C$_6$H$_2$—CH$_3$—NO$_2$—ONa—HgOH+2HCl→
C$_6$H$_2$—CH$_3$—NO$_2$—OH—HgCl+NaCl+H$_2$O.

The following examples illustrate my invention:

Example 1

27.5 grams of 2-nitro-para-cresol prepared by diazotization of 2-nitro-para-toluidine and decomposition with sulphuric acid (Berichte-15, 2980) are dissolved in 7.2 g. of NaOH and 1200 cc. of H$_2$O. To this is added 57 gm. of mercuric acetate dissolved in 210 cc. of water and 12 cc. of acetic acid. The mixture is boiled until the nitrocresol is completely mercurated, this being determined by removing a small portion of both precipitate and solution from the reaction mixture and adding to this a solution of sodium hydroxide. If a clear yellow to orange red solution is obtained, the mercuration is complete. The mixture is cooled and filtered. The dried precipitate is then dissolved in boiling acetic acid, using sufficient acid to obtain a clear solution, which is filtered and cooled. Crystals of acetoxy-mercuri-nitro-cresol separate. This is repeated twice and the final batch of crystals is washed with acetone and dried. The product, 5-acetoxy-mercuri-2-nitro-para-cresol, consisting of pale greenish-yellow needles, darkening at 212° C., and not melting below 300° C., may be represented:

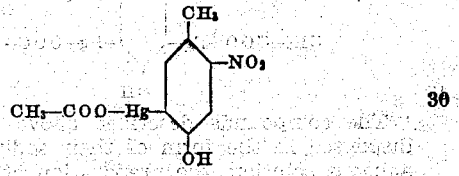

20.55 grams of the pure acetoxy mercuri compound are suspended in water and 4 grams of sodium hydroxide added. The mixture is heated to boiling to obtain a clear solution, the boiling is maintained for fifteen minutes, and the solution filtered from any insoluble material.

To this solution, add gradually dilute acetic acid (30%), with stirring, until the mixture is just acid to litmus. The precipitated anhydro-hydroxy-mercuri-nitro-cresol is then washed well with water by decantation and finally filtered and dried in vacuum. This produces the anhydro-hydroxy-mercuri-2-nitro-para-cresol:

It is an amorphous powder of orange color, insoluble in water, soluble in dilute alkalies. Color of alkaline solution (1:500) is orange yellow.

Example 2

By using 3-nitro-para-cresol prepared by simultaneous diazotization and nitration of para-toluidine (Berichte-24, 1960) or by nitration of para-cresol in benzene medium (Berichte-40, 4324) and employing the method and quantities described in Example 1, I obtain 5-acetoxy-mercuri-3-nitro-para-cresol:

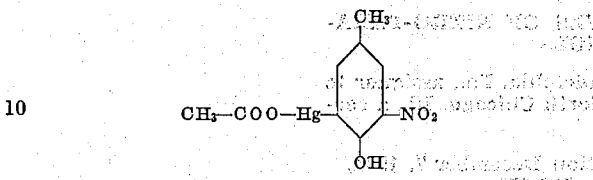

lemon-yellow aggregates of prisms, darkening at 260° C., not melting below 300° C.; and anhydro-hydroxy-mercuri-3-nitro-para-cresol:

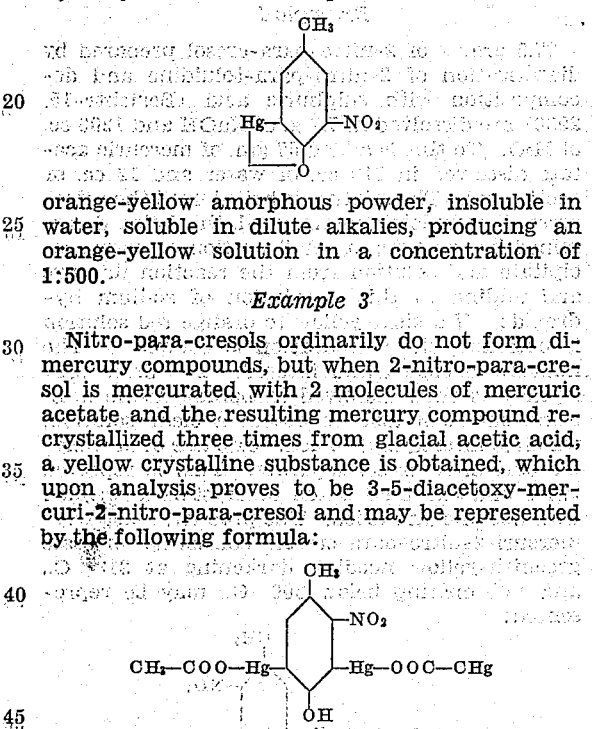

orange-yellow amorphous powder, insoluble in water, soluble in dilute alkalies, producing an orange-yellow solution in a concentration of 1:500.

*Example 3*

Nitro-para-cresols ordinarily do not form dimercury compounds, but when 2-nitro-para-cresol is mercurated with 2 molecules of mercuric acetate and the resulting mercury compound recrystallized three times from glacial acetic acid, a yellow crystalline substance is obtained, which upon analysis proves to be 3-5-diacetoxy-mercuri-2-nitro-para-cresol and may be represented by the following formula:

The compounds described above are usually dispensed in the form of their sodium salts in aqueous solution, the preparation of which will be obvious to those skilled in the art.

As an example of the bactericidal properties of the substances described above, reference may be made to laboratory tests of the anhydro-hydroxy-mercuri-2-nitro-4-cresol. This product from one hour's exposure to bacteria is substantially equal to metaphen, the product described in my Patent No. 1,554,293, reissued as No. 17,563, the latter being a mercury derivative of 4-nitro-ortho-cresol. However, on longer exposure, the former compound shows a much higher bactericidal value than metaphen. Thus, the inhibitive effect of this compound against staphylococcus aureus is twice as strong as that of metaphen at 24, 48 and 72 hours.

Changes and variations coming within the spirit of my invention will doubtless suggest themselves to those skilled in the art. Hence, I do not wish to be limited to the specific embodiments disclosed herein or uses mentioned except to the extent set forth in the appended claims, which are to be interpreted as broadly as the state of the art will permit.

I claim as my invention:

1. A mercury compound of a nitro-para-cresol, characterized by a high bactericidal and bacteriostatic value.

2. An anhydro-hydroxy-mercuri compound of a nitro-para-cresol, characterized by a high bactericidal and bacteriostatic value.

3. An hydroxy-mercuri compound of a nitro-para-cresol, characterized by a high bactericidal and bacteriostatic value.

4. A mercury compound of 2-nitro-para-cresol, characterized by a high bactericidal and bacteriostatic value.

5. A mercury compound of 3-nitro-para-cresol, characterized by a high bactericidal and bacteriostatic value.

6. A bactericidal substance having the formula:

$$C_6H_2\text{---}CH_3\text{---}NO_2\text{---}OX\text{---}HgOH$$

where X is an alkali metal.

7. Anhydro-hydroxy-mercuri-2-nitro-paracresol, which may be represented by the structural formula:

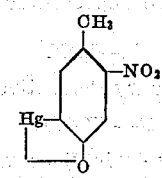

8. Anhydro-hydroxy-mercuri-3-nitro-paracresol, which may be represented by the structural formula:

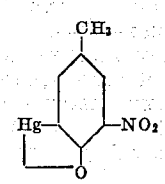

GEORGE W. RAIZISS.

Certificate of Correction

Patent No. 1,985,949.

January 1, 1935.

GEORGE W. RAIZISS

It is hereby certified that error appears in the printed specification of the above numbered patent requiring correction as follows: Page 2, first column, in the graphic formula between lines 40 and 45, at the extreme right of formula, for "$CH_g$" read $CH^3$; and that the said Letters Patent should be read with this correction therein that the same may conform to the record of the case in the Patent Office.

Signed and sealed this 22nd day of January, A. D. 1935.

[SEAL]

LESLIE FRAZER,
*Acting Commissioner of Patents.*